US008640095B2

(12) United States Patent
Flurry et al.

(10) Patent No.: US 8,640,095 B2
(45) Date of Patent: Jan. 28, 2014

(54) MELDING OF MEDIATION FLOW SERVICE COMPONENT ARCHITECTURE (SCA) COMPONENTS

(75) Inventors: Gregory A. Flurry, Austin, TX (US); Chris Gerken, Austin, TX (US); Paul Verschueren, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 13/526,464

(22) Filed: Jun. 18, 2012

(65) Prior Publication Data
US 2012/0254834 A1    Oct. 4, 2012

Related U.S. Application Data

(62) Division of application No. 12/650,798, filed on Dec. 31, 2009.

(51) Int. Cl.
*G06F 9/44* (2006.01)

(52) U.S. Cl.
USPC ........... 717/120; 717/100; 717/101; 717/106; 717/107

(58) Field of Classification Search
USPC .......................... 717/120, 100, 101, 106, 107
See application file for complete search history.

(56) References Cited

U.S. PATENT DOCUMENTS

| 7,617,500 | B2 * | 11/2009 | Astl et al. | 719/311 |
|---|---|---|---|---|
| 7,861,243 | B2 * | 12/2010 | Narayanaswamy et al. | 717/177 |
| 7,941,784 | B2 * | 5/2011 | Shenfield et al. | 717/107 |
| 2004/0111702 | A1 * | 6/2004 | Chan | 717/113 |
| 2004/0177352 | A1 * | 9/2004 | Narayanaswamy et al. | 717/169 |
| 2005/0289536 | A1 * | 12/2005 | Nayak et al. | 717/174 |
| 2006/0179418 | A1 * | 8/2006 | Boyd | 717/100 |
| 2006/0206861 | A1 * | 9/2006 | Shenfield et al. | 717/106 |
| 2008/0270974 | A1 * | 10/2008 | Topchiyski et al. | 717/104 |
| 2009/0276770 | A1 * | 11/2009 | Taieb et al. | 717/177 |
| 2011/0023013 | A1 * | 1/2011 | Shenfield et al. | 717/107 |

* cited by examiner

*Primary Examiner* — Idriss N Alrobaye
*Assistant Examiner* — Getente A Yimer
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for melding mediation and adaptation modules of a service component architecture (SCA) system. A method for melding mediation and adaptation modules of an SCA system can include selecting each of a mediation module and an adaptation module in an integrated development tool executing in memory by a processor of a computer and loading respectively different descriptor files for each of the mediation module and the adaptation module. The method further can include combining descriptors from the different descriptor files into a single descriptor file for a melded module. Finally, the method can include modifying names and wiring descriptors in the single descriptor file for the melded module to account for a combination of the mediation component and the adaptation component in the melded component.

2 Claims, 2 Drawing Sheets

MELDING OF MEDIATION FLOW SERVICE COMPONENT ARCHITECTURE (SCA) COMPONENTS

CROSS-REFERENCE TO RELATED APPLICATIONS

This application is a Divisional of U.S. application Ser. No. 12/650,798, filed Dec. 31, 2009, the entirety of which is incorporated herein by reference.

BACKGROUND OF THE INVENTION

1. Field of the Invention

The present invention relates to the field of component interoperation in a service component architecture (SCA) and more particularly mediation and adaptation SCA components.

2. Description of the Related Art

The Service-Oriented Architecture (SOA) is a framework that combines individual business functions and processes, referred to in the art as "services", to implement sophisticated business applications and processes. In an SOA framework, relatively coarse-grained business components are exposed as services. SOA structures information technology assets as a series of reusable services, which are loosely coupled and are platform-neutral and implementation-neutral. The SOA framework designs solutions as assemblies of services, which are connected through well-specified interfaces and contracts.

The Service Component Architecture (SCA) is a specification that describes a model for building applications and systems using SOA and simplifies application development and implementation developed using SOA. In this regard, the SCA provides a mechanism to build coarse-grained components as assemblies of fine-grained components. Consequently, the SCA relieves programmers from the complexity of traditional middleware programming by abstracting it from business logic. SCA further allows developers to focus on writing business logic and can free those developers from the need to spend significant programming and design cycles on more low-level implementation techniques.

An SCA module is the largest composition of tightly-coupled components that are developed and deployed together into an SCA system. The SCA module is the basic unit of a loosely-coupled composition within an SCA system. Generally, an SCA module contains a set of components, external services, entry points, and the wires that interconnect those components, services and entry points. Modules in turn contribute service implementations to the SCA system. Entry points define the public services provided by the module, which can either be used by other components within the same module or which can be made available for use outside the module. These are used to publish services provided by a module using a specified binding. External services within a module, by comparison, represent remote services provided by other modules and are external to the SCA module that uses the service. These external services can be accessed by components within the module like any service provided by an SCA component and external services use bindings to describe the access to external services.

Common modules requisite to an SCA system include both mediator and adapter modules. Mediation modules are SCA modules that can change the protocol, the format, content or target of service requests. Mediation modules operate on messages that are in flight between service requestors and service providers that use different communication protocols and allow for the routing of messages to different service providers. Mediation modules also can transform messages through the amendment of message content or form. In addition, mediation modules can provide functions such as message logging, and error processing tailored to designer requirements. In contrast, Adaptation modules are SCA modules that only bridge incompatible communication protocols and data formats between service requestors and service providers.

Traditionally, the SCA lends itself to the separate existence of mediation and adaptation modules such that each can be developed independently of one another and each can be maintained and modified independently of one another. However, the performance of an SCA system utilizing separate and independent mediation and adaptation modules falls far short of the case where the adaptation and mediation logic were included in a single component. Notwithstanding, to include the adaptation and mediation logic in a single component renders the ability to maintain each function independently null and void.

BRIEF SUMMARY OF THE INVENTION

Embodiments of the present invention address deficiencies of the art in respect to mediation and adaptation in an SCA system and provide a novel and non-obvious method, system and computer program product for melding mediation and adaptation modules of an SCA system. A method for melding mediation and adaptation modules of an SCA system can include selecting each of a mediation module and an adaptation module in an integrated development tool executing in memory by a processor of a computer and loading respectively different descriptor files for each of the mediation module and the adaptation module. The method further can include combining descriptors from the different descriptor files into a single descriptor file for a melded module. Finally, the method can include modifying names and wiring descriptors in the single descriptor file for the melded module to account for a combination of the mediation component and the adaptation component in the melded module.

In one aspect of the embodiment, selecting each of a mediation module and a module component in an integrated development tool can include first selecting a mediation template for a mediation module absent an import, and also an adaptation module. Subsequently, a canonical interface can be applied to the selected mediation template to produce a selected mediation component contained in a module. Thereafter, descriptor files for the selected mediation component and the adaptation component from the adaptation module can be melded together into a single component. Additionally, once the single descriptor file has been created, the single descriptor file can be loaded for the melded module, component artifacts can be generated for each descriptor in the single descriptor file, and the artifacts can be deployed as the melded module in an SCA system defined by the integrated development tool.

In another embodiment of the invention, a software development data processing system can be configured for melding mediation and adaptation modules of an SCA system. The data processing system can include a host server with processor and memory configured for communicative coupling to clients over a computer communications network. The system also can include an operating system executing in the host server and an integrated development tool operating in the operating system. Finally, a mediation component meld module can be coupled to the integrated development tool.

The module can include program code that when executed by the processor of the host server, loads respectively different descriptor files for each of a selected mediation module and a selected adaptation module, combines descriptors from the different descriptor files into a single descriptor file for a melded module, and modifies names and wiring descriptors in the single descriptor file for the melded module to account for a combination of the mediation component and the adaptation component in the melded module. The system also can include a project repository of component descriptors, composite descriptors and component type descriptors for the SCA system. As such, the program code of the mediation component meld module when executed by the processor can store the single descriptor file for the melded module in the project repository. Finally, the system can include different templated mediation components each lacking an import. Consequently, the program code of the mediation component meld module can apply a canonical interface to a selected one of the templated mediation components to produce the selected mediation module.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for the melding of mediation and adaptation modules of an SCA system into a single, melded module for use in an SCA composition of an SCA system. In accordance with an embodiment of the invention, a descriptor file for a mediation module of an SCA system can be loaded as can a descriptor file for an adaptation module of the SCA system. Descriptors in each descriptor file can be merged into a single file of descriptors. Thereafter, naming and wiring descriptors in the single file can be modified to reference the melded components wired together rather than the individual mediation and adaptation components. Thereafter, the single file can be persisted for subsequent use in generating a run time form of the melded module for the SCA system. In this way, the mediation and adaptation module of the SCA system can be maintained separately, but once combined into a melded module, can achieve optimal runtime performance.

Figure 1A:
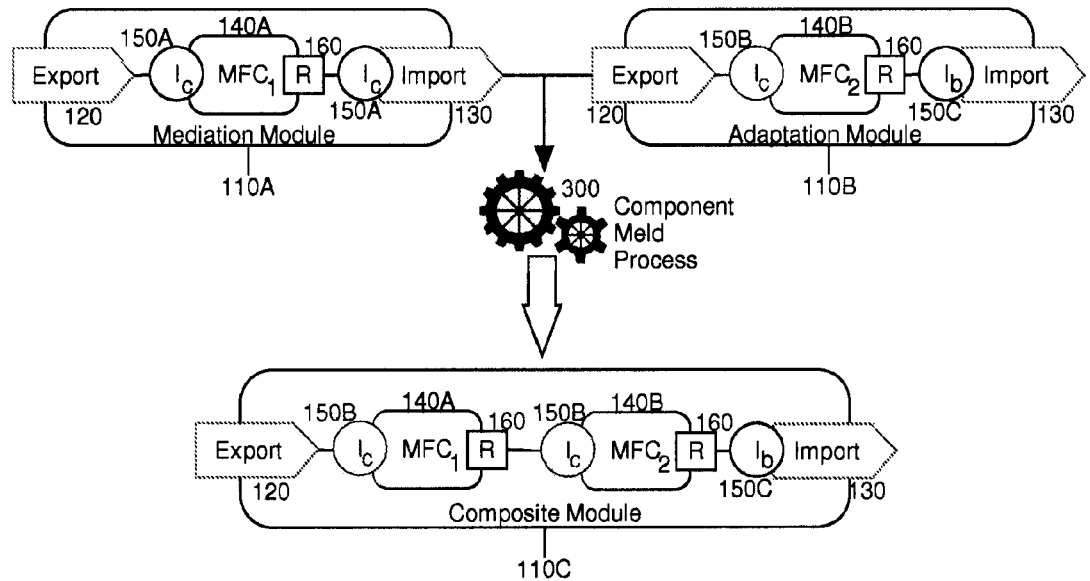
FIG. 1A is a pictorial illustration of a process for melding mediation and adaptation components of an SCA system.

In illustration, FIG. 1A pictorially shows a process for melding mediation and adaptation module of an SCA system. As shown in FIG. 1, a mediation module 110A can be provided as can an adaptation module 110B. The mediation module 110A can specify mediation component logic 140A in addition to an import 130 and export 120. Likewise, the adaptation module 110B can specify mediation adaption component logic 140B in addition to an import 130 and export 120. The import 130 of the mediation component 110A (or mediation module 110A) can conform to upstream interface 150A, whereas the export provides a reference 160 to the canonical interface 150B of the adaptation component 110B (or adaption module 110B). The adaptation component 110B in turn can include a reference 160 conforming to a downstream interface 150C.

Of note, a component meld process 300 can meld together the mediation module 110A and the adaptation module 110B into a melded module 110C including the logic both for the mediation component 110A and the adaptation component 110B, as well as the import 130 and the export 120. In this regard, the meld process 300 can load the descriptor files for each of the mediation component 110A and the adaptation component 110B and the descriptors for each of the files can be combined into a single file. The descriptors once combined into a single descriptor file can be modified to ensure the uniqueness of names in the descriptor file for the single melded component 110C (or composite module 110C). Further, the descriptors directed to wiring can be modified to ensure the presence of the canonical interface 150B matching the export 120 as well as internal wiring between the mediation component logic 140A and adaptation component logic 140B.

The process described in connection with FIG. 1A can be expanded upon to accommodate a templated form of the mediation component 110A for different external mediation services. In illustration, FIG. 1B pictorially depicts a process for melding a templated mediation module and an adaptation module of an SCA system. As before, an adaptation module 110B can specify adaption mediation flow component logic 140B in addition to an import 130 and export 120. However, a templated form of mediation module 110D can be provided specifying only the mediation component logic 140A, export 120, upstream interface 150A and reference 160. The import for the mediation, of course, can vary according to a selected external service as set forth by the import 130 of the adaptation component 110B. As such, a canonical interface 150B can be provided at the time of melding and the component meld process 300 can meld together the templated mediation module 110D with the canonical interface 150B applied to the adaptation module 110B into a melded module 110C including the logic both for the templated mediation component 110D and the adaptation component 110B.

Figure 1B:
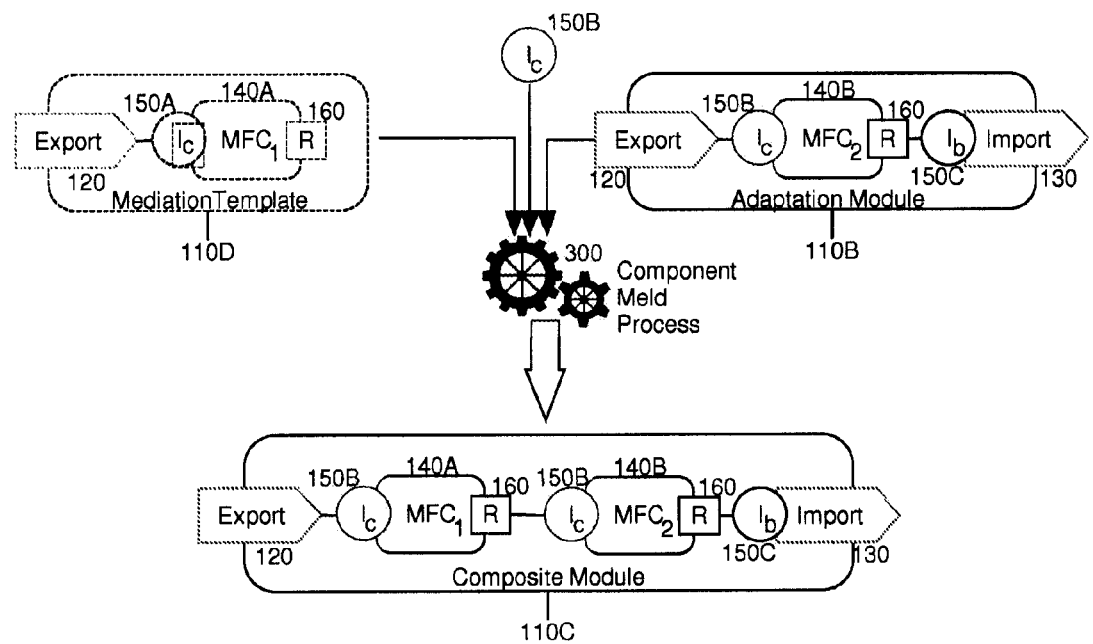
FIG. 1B is a pictorial illustration of a process for melding a templated mediation component and an adaptation component of an SCA system.
Figure 2:
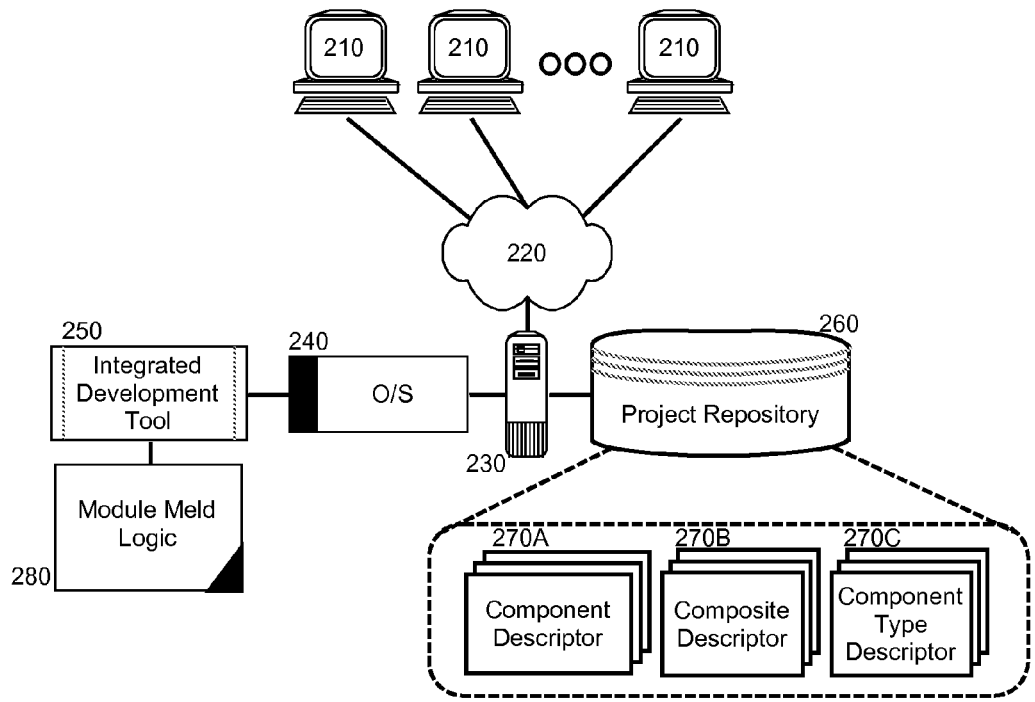
FIG. 2 is a schematic illustration of an software development data processing system configured for melding mediation and adaptation components of an SCA system; and, FIG. 3 is a flow chart illustrating a process for melding mediation and adaptation components of an SCA system.

The process described in connection with FIGS. 1A and 1B can be performed in a software development data process system configured for the specification of an SCA system. In yet further illustration, FIG. 2 is a schematic illustration of an software development data processing system configured for melding mediation and adaptation modules of an SCA system. The system can include a host server 230 with processor and memory configured for communicative coupling to different clients 210 over computer communications network 220. The host server 230 can support the execution of operating system 240 that in turn can host the operation of an integrated development tool 250 accessible by the clients 210 and configured for developing applications according to a service oriented architecture (SOA) and more particularly an SCA programming model.

In this regard, a project repository 260 can be linked to the host server 230 and accessible by the integrated development tool 250 through the operating system 240. The project repository 260 can store different projects composed within the integrated development tool 250, the projects generally including different composite descriptor files 270A referencing different components in different component descriptor files 270A with variable aspects dictated by component types stored in different component type descriptor files 270C. Of note, module meld 280 can be coupled to the integrated development tool 250 and the project repository 260. The module meld 280 can include program code enabled to meld together a mediation module with an adaptation module to produce a single component descriptor file for a melded module with logic both for the mediation component and adaptation component.

Figure 3:
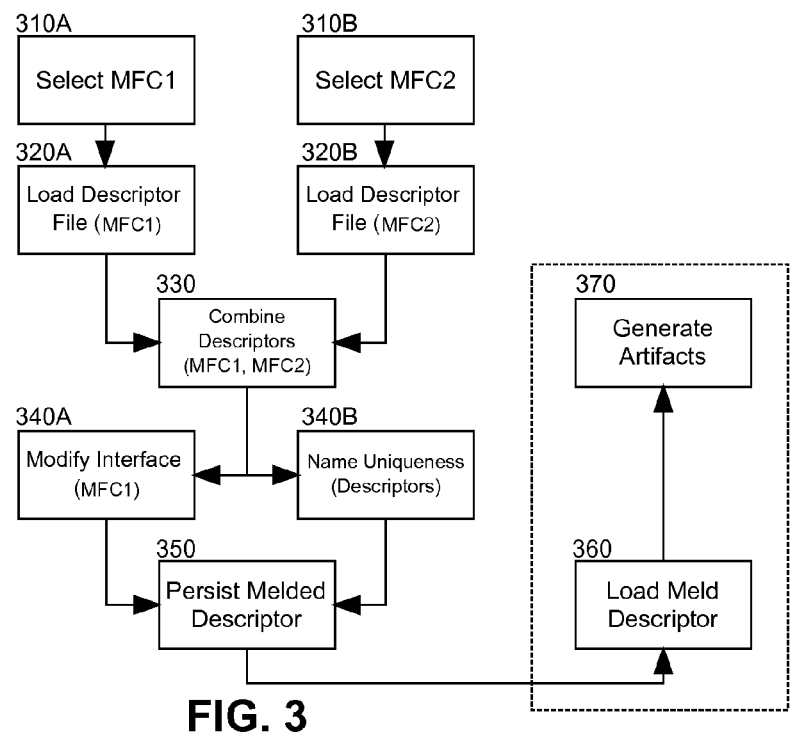

In even yet further illustration of the operation of the module meld 280, FIG. 3 is a flow chart illustrating a process for melding mediation and adaptation modules of an SCA system. Beginning in block 310A and 310B, each of a mediation module and an adaptation module can be selected for melding and in block 320A and 320B, a descriptor file for each can be loaded, each descriptor file including a set of descriptors specifying references to implementation logic for each component, and one or more entry points each with a corresponding binding. In block 330, the descriptors from each of the loaded files can be combined into a single file for a melded module.

In block 340A, the interface descriptors can be modified in the combined single file to reflect the entry points and corresponding bindings of the combined single file and also the invocation of logic for the mediation aspect of the melded module and the adaptation aspect of the melded module. Further, in block 340B, names set forth in the descriptors in the combined single file can be modified where necessary to ensure uniqueness within the combined single file. Finally, in block 350, the single file can be persisted such that in block 360 the single file can be loaded and in block 370 requisite artifacts can be generated to create an executable form of the melded module from the single file for deployment into an SCA system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for melding mediation and adaptation modules of a service component architecture (SCA) system, the method comprising:

selecting each of a mediation module and an adaptation module in an integrated development tool executing in memory by a processor of a computer, each of the mediation module and the adaptation module comprising at least one mediation flow component;

loading respectively different descriptor files for each of the mediation module and the adaptation module;

combining descriptors from the different descriptor files into a single descriptor file for a melded module;

modifying names and wiring descriptors in the single descriptor file for the melded module to account for a combination of mediation flow components from each of the mediation module and the adaptation module in the melded module;

loading the single descriptor file for the melded module;

generating component artifacts for each descriptor in the single descriptor file; and, deploying the component artifacts as the melded component in the SCA system defined by the integrated development tool.

2. The method of claim 1, wherein selecting each of a mediation module and an adaptation module in an integrated development tool executing in memory by a processor of a computer, comprises:

selecting a mediation template for a mediation module absent an import, and also an adaptation module; and, applying a canonical interface to the selected mediation template to produce a selected mediation component in a module.

\* \* \* \* \*